April 10, 1951 P. F. ROSSMANN ET AL 2,548,847
MEANS FOR CONTROLLING WINDOWS AND THE LIKE
Filed Feb. 27, 1948
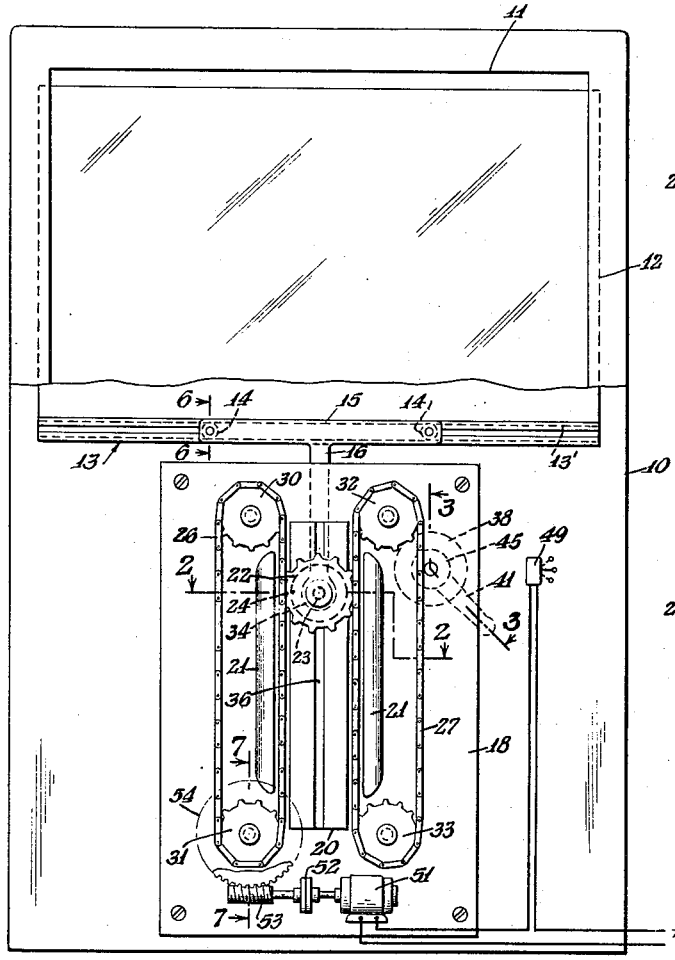
FIG. 1.
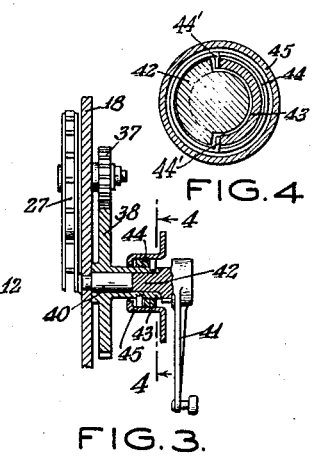
FIG. 3.
FIG. 4.
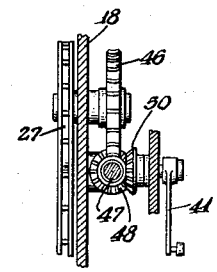
FIG. 5.
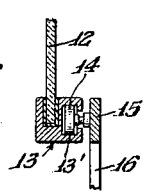
FIG. 6.
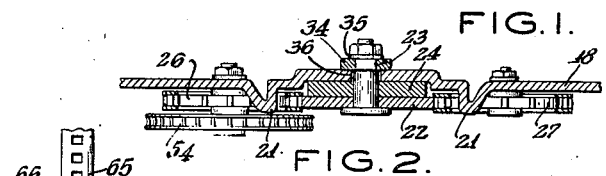
FIG. 2.
FIG. 9.
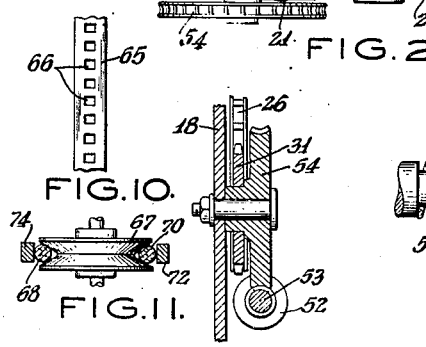
FIG. 10. FIG. 11. FIG. 8.
FIG. 7.
INVENTORS.
PETER F. ROSSMANN
AND KARL RATH
BY Patented Apr. 10, 1951

2,548,847

UNITED STATES PATENT OFFICE 2,548,847

MEANS FOR CONTROLLING WINDOWS AND THE LIKE

Peter F. Rossmann, Morristown, N. J., and Karl Rath, New York, N. Y.

Application February 27, 1948, Serial No. 11,618

11 Claims. (Cl. 268—124)

The present invention relates to arrangements for the operation of windows or similar devices, more particularly to an improved window regulating device for automobiles and other vehicles.

Known types of automatic window regulating devices for automobiles operated by electric, hydraulic or pneumatic means have been found unsatisfactory for various reasons, in particular that none of the known designs provides for a safe and reliable manual window operation, in the event of failure of the automatic system.

As is evident, both damage and discomfort may result if it is impossible to close the window of an automobile to keep out weather or to prevent theft through failure of the automatic system. Likewise, in the event of accident when the doors become jammed and the electric, hydraulic or pneumatic systems are damaged, escape of the occupants may be entirely impossible.

Accordingly, it is an object of the present invention to overcome the afore-mentioned drawbacks and disadvantages inherent in prior window control systems and to provide an improved arrangement for operating a window both manually and/or automatically, substantially without requiring any additional switching or adjusting operations when changing from one operation to the other and without mutual interference between the automatic and manual driving sources.

Other objects of the invention are to provide a manual and/or automatic control device of the above type which is both simple in construction and cheap to manufacture; which requires little space and may be easily and readily installed in an automobile door; which may be controlled both manually and/or automatically either separately or combinedly in both a positive and negative relation; which may be started from any window position either manually and/or automatically; which will require no shifting, recycling, switching or other additional operations when changing from manual to automatic control and vice versa, or when changing from single to combined manual and power driven operation; and which will require no special instructions to be followed on the part of the operator as to the sequence of operating steps or precautions liable to interfere with normal driving habits.

Further objects and novel aspects of the invention will become more apparent from the following detailed description of a preferred practical embodiment, reference being had to the accompanying drawing forming part of this specification and wherein:

Figure 1 represents an automobile door with its front wall partly removed and being equipped with a combined manual and automatic window regulator constructed in accordance with invention;

Figure 2 is an enlarged cross-sectional view taken on line 2—2 of Figure 1;

Figure 3 is an enlarged sectional view of the manual drive taken on line 3—3 of Figure 1;

Figure 4 is a section taken on line 4—4 of Figure 3;

Figure 5 is a view similar to Figure 3 and showing a modified construction of the manual drive;

Figure 6 is an enlarged sectional view taken on line 6—6 of Figure 1;

Figure 7 is an enlarged sectional view of the power drive taken on line 7—7 of Figure 1;

Figure 8 is a cross-section of the special overload slip clutch connecting the power drive with the window control mechanism;

Figure 9 is a plan view of the coupling shown in Figure 6; and

Figures 10 and 11 are partial diagrams illustrating modifications of the operating mechanism shown in the previous views.

Like reference numerals identify like parts throughout the different views of the drawing.

Referring to Figures 1 and 2, the numeral 10 schematically shows an automobile door having the lower portion of its front wall removed to reveal the control mechanism mounted therein. Numeral 11 indicates the window frame and 12 indicates a window pane arranged for upward and downward movement and provided at its lower end with a metal frame or equivalent supporting member 13. In the example illustrated, the member 13, as more clearly shown in Figure 6, is provided with a channel portion 13' which serves as a guide for a pair of rollers 14 attached to a horizontal bar 15 which is secured to or integral with a vertical link 16 connected to the window operating mechanism described in the following:

The window operating mechanism, in the example shown, comprises a base plate or support 18 formed or otherwise provided with a vertical guide channel 20 and a pair of parallel ridges 21 or equivalent guide members on either side of said channel. A sprocket or pinion 22 mounted to rotate freely on a shaft or pin 23 is arranged for upward and downward translatory movement by the provision of a slide member 24 movable within the channel 20 and being of square, circular or any other suitable shape and secured to the pin 23. Sprocket 22 furthermore engages a pair of endless chains 26 and 27 or equivalent flexible members arranged to move over guide sprockets 30, 31 and 32, 33, respectively, and along the inner faces of the ridges or equivalent guide members 21.

The chains 26 and 27 are arranged to be operated by a power or manual drive, respectively, through suitable unidirectional or irreversible clutch or coupling means described in greater detail hereafter, in such a manner as to enable either power driven or manual operation of the window to be carried out substantially independently of each other or simultaneously in both a positive and negative relation. As a result, the sprocket 22 in addition to rotating about pin 23 will carry out a translatory upward or downward movement by the action of the slide member 24 moving within channel 20. Member 24 may be directly attached to the link 16 for raising or lowering the window 12.

In the example illustrated, the link 16 is attached to a further guide member 34 which in turn is secured, such as by means of a nut 35, to the rear end of pin 23 passing through a guide slot 36 in the channel portion 20 of support 18. In this manner, additional guidance will be afforded for the translatory upward and downward movement of the sprocket 22 and in turn for the window 12. As will be understood, the channel 20 and guide member 24 may be omitted, in which case guidance in the upward and downward direction for the sprocket 22 will be provided by pin 23 moving in the guide slot 36.

The manual drive, as more clearly shown in Figure 3, comprises a first gear 37 mounted upon a common shaft with the guide or driving sprocket 32 of chain 27 and meshing with a second gear 38 rotatably mounted upon a pin or shaft 40 secured to support plate 18. Gear 38 is in turn connected to a hand crank or handle 41 through an irreversible or unidirectional friction clutch or an equivalent coupling device designed to allow of rotary motion to be readily transmitted by the handle 41 to the sprocket 32 and chain 27, while blocking transmission in the reverse direction. The friction clutch shown in Figures 3 and 4 comprises a pair of interengaging axial lugs or segmental elements 42 and 43 integral with or attached to the handle 41, on the one hand, and to the gear 38, on the other hand, and a coil spring 44 encircling said elements and being provided with hooked ends 44' interposed between the adjoining lateral faces of said elements, in such a manner as to cause a contraction of the spring by the segment 42 pressing against one side of one of the hooked ends 44' and release of its periphery from the surrounding case or housing 45 upon rotation of the handle 41. In this manner, rotary motion will be enabled to be transmitted freely from the handle 41 for manually raising and lowering the window by causing the sprocket 22 to move up and down along the chain 26 which is held stationary during the manual operation by the provision of a similar or equivalent irreversible coupling means between the power driving source and associated chain driving means to be described in detail hereafter. On the other hand, operation of the window by the chain 26 and the power source will be enabled by virtue of the chain 27 being held stationary through the action of the unidirectional friction clutch by causing the clutch spring 44 to expand and lock against the inside of the housing 45 by the action of segment 43 pressing against the other side of the hooked ends 44'.

In place of the unidirectional friction clutch shown in Figure 3, any other irreversible coupling means may be employed for the purpose of invention, such as a worm gear drive as shown in Figure 5. The latter comprises a worm wheel 46 mounted upon the shaft of driving sprocket 32 and meshing with a worm gear 47 connected to the handle 41 through a pair of bevel gears 48 and 50. Due to the relatively low pitch angle of the worm gear 47 and the relatively high pitch angle of the worm wheel 46, rotary motion may be transmitted freely from the handle 41 to the window operating mechanism by way of the differential chain drive, while transmission of motion in the reverse direction will be blocked, thus enabling chain 27 to remain stationary and to serve as a fixed reference point for the translatory movement of the sprocket 22 during the operation of chain 26 by the power source.

The power drive as shown in Figures 1 and 7, comprises an electric motor 51 driving a worm gear 53 through an over-load friction or slip clutch 52 of special design to be described hereafter. Worm gear 53 meshes with a worm wheel 54 which is mounted upon the shaft of driving sprocket 31 meshing with chain 26. This worm gear drive again allows of rotary motion to be transmitted by the motor to the window operating mechanism, while blocking transmission in the reverse direction and allowing the chain 26 to act as a fixed reference point for the sprocket 22 during the manual window operating in the manner described and readily understood from the foregoing.

The motor may be energized to start rotation in either direction by means of a suitable source of electric power (not shown) such as a battery and a self-centering reversible switch 49 of known construction for either raising or lowering the window, as will be readily understood.

As shown in Figure 8, the slip clutch 52 connecting the motor 51 with the worm gear 53 comprises a first splined flange or disc 55 arranged to move axially on shaft 56 of the worm gear 53, said shaft being guided or piloted in shaft 57 of the motor 51 by an axial extension 58. The friction disc 60 may be attached either to flange 55 or to the cooperating flange 61 on shaft 57, or may float freely. Coil spring 62 serves to hold the friction disc 60 in contact with the flanges 55 and 61 with sufficient pressure to prevent slippage during the normal movement of the window but allowing the clutch to yield or slip when the window has reached the open or closed limit positions or has become stuck or jammed in an intermediate position. In the latter case, the added resistance or load on the motor may be overcome without having to disconnect the same, by a slight turn of the handle 41 to restore the power driven operation. Accordingly, a relatively small and inexpensive motor may be used suitable for normal operation, while any emergency or excess load such as due to jamming of the window may be overcome by an added manual torque. An overload clutch of this type also eliminates the necessity of limit switches for stopping the motor in the end position of the window.

The slip coupling shown in Figures 8 and 9 is of a special construction to provide a sharp cut-off or quick acting release of the motor driving force upon encountering a predetermined excess load, such as upon reaching the limit positions of the window or when the window should become jammed or stuck in an intermediate position. For this purpose, the hub of flange or clutch disc 55 is provided with a pair of diametrical angular slots 63 engaged by the opposite ends of a pin 64 radially fitted to the shaft 56. This will have the effect that with the clutch discs 55 and 61 beginning to slip initially relative to each other upon reading a predetermined excess load by the motor, pin 64 by camming with the inner surface of the slots 63 will cause a slight axial movement of shaft 56 in a direction away from shaft 57, in such a manner as to result in an instant release of the friction coupling force, as will be readily understood. Slots 63 are advantageously somewhat wider than the pin 64, as shown in Figure 9, to provide for the movement of spring 62 and wear during use. Although two slots have been shown in the drawing, a single slot may be sufficient, as will be readily understood.

There is thus provided by the invention a window regulating mechanism for both power driven and/or manual operation and constructed in such a manner as to enable either control to be carried out independently of the other or to enable both controls to be used combinedly, substantially without mutual interference between the respective driving means and without requiring any shifting, recycling, switching or other operations, when changing from one type to the other type of control or when changing from single to combined control and vice versa. More particularly, the invention provides a substantially foolproof, reliable and safe automobile window control system adapted to cope with any emergency or driver's choice substantially without interfering with normal driving habits.

In place of the chains 26 and 27, any equivalent driving means may be employed, such as a pair of endless metal bands or strips of other suitable material, as indicated at 65 in Figure 10 and provided with a series of longitudinal perforations 66 adapted to engage the teeth of the guiding and driving sprockets, as is readily understood. It will be furthermore understood that the guide members 30 and 33 may be in the form of simple rollers and that only members 31 and 32 need be provided with sprockets or teeth engaging the chains or equivalent driving members.

According to an alternative construction, simple endless belts or ropes 68 and 70 of rubber or other flexible material may be provided and arranged to be driven by suitable friction driving and guide pulleys and which serve to operate a preferably conical shaped friction wheel or pulley 67, as shown in Figure 11. Suitable resilient pressure members, schematically indicated at 71 and 72 serve to maintain the belts or ropes 68 and 70 in sufficient friction contact with the pulley 67 which serves to operate the window in a manner similar to the sprocket 22 and readily understood from the foregoing.

According to another modification, the chains 26 and 27 may be in the form of flexible racks cooperating with suitable guiding and driving sprockets and consisting of synthetic rubber or the like advantageously reinforced by metallic inserts embedded therein during the molding operation.

It is to be furthermore understood, that the multiple drive mechanism as shown and described herein has many other uses and applications and may be employed wherever it is desired to operate a control member carrying out a translatory or reciprocating movement either automatically by means of a motor and/or manually, such as for regulating or operating doors, valves or the like, as will be readily understood.

An arrangement of the type described may also be designed for exclusive manual or automatic control by replacing either of the chains 26 or 27, respectively, by a stationary or fixed rack. Thus, if chain 26 is replaced by a fixed rack cooperating with the sprocket 22 and if the motor drive is omitted, the chain 27 driven by the hand crank 41 will enable a control of the window or other driven member in substantially the same manner as described hereinabove. The same applies to a motor driven system by substituting for the chain 27 a fixed rack and omitting the manual drive, as will be readily understood.

An advantage of a device of the latter type for operating a reciprocating member is the fact that the translatory movement or displacement of the sprocket 22 may be directly transmitted to the driven member without linkage or gear arrangements for converting rotary into translatory movement. Another advantage is the fact that the chain or other flexible driving member may have any configuration by passing it over suitable guide sprockets or rollers to suit any existing space conditions or other requirements that may be encountered, such as in the case of automobile window or any other applications in practice.

While there has been shown and described a desirable embodiment of the invention, it will be evident from the foregoing that this disclosure is for the purpose of illustration and that variations and modifications in size, shape and arrangements of parts, as well as the substitution of equivalent elements for those herein shown and described, may be made in accordance with the broader scope and spirit of the invention, as defined in the appended claims. The specification and drawing are accordingly to be regarded in an illustrative rather than in a limiting sense.

We claim:

1. The combination with a window regulating device including operating mechanism for raising and lowering a window and including means for controlling said mechanism comprising a driving motor with means for starting the same in either direction and a manual operating member, of multiple drive means connecting said motor and operating member with said mechanism comprising a pair of flexible endless members with means for guiding the same along a straight path in spaced parallel relation to each other, a driving member cooperating with both said flexible members for rotation thereby and translatory movement along said path, a unidirectional coupling between said motor and operating member and said flexible members respectively for unidirectionally transmitting motion from said motor and said control member to said driving member, while blocking transmission in the reverse direction, and means for transmitting translatory motion from said driving member to said operating mechanism.

2. In a device as claimed in claim 1, wherein at least one of said coupling means consists of an irreversible spring clutch adapted to transmit rotary motion to the associated flexible member but blocking transmission in the reverse direction.

3. In a device as claimed in claim 1, wherein at least one of said coupling means consists of a worm gear drive adapted to transmit motion to the respective flexible member and blocking transmission in the reverse direction.

4. The combination with a window regulating device including operating mechanism for raising and lowering a window, means for controlling said mechanism comprising a driving motor with means for starting the same in either direction and a manually operable control member, multiple drive means between said motor and said control member on the one hand and said operating mechanism on the other hand comprising a pair of endless flexible members with means for guiding the same along a straight path in spaced parallel relation to each other, a rotary driving member with means for guiding the same along said path and cooperating with both said flexible members, coupling means for driving each of said flexible members by said motor and said control member, respectively, means for blocking driving connection in the direction from said flexible members to said motor and said control member, and further means for transmitting translatory movement of said driving member to said operating mechanism.

5. In combination with a window regulating device including operating mechanism for raising and lowering a window, means for controlling said mechanism comprising a driving motor with means for starting and stopping the same for rotation in either direction and a manually operable control member, of multiple drive means connecting said motor and said member on the one hand with said mechanism on the other hand comprising a pair of endless driving chains with means for driving and guiding the same along a straight path in parallel relation to each other, driving sprocket means with means for guiding the same along said path and engaging said chains for rotation thereby and translation along said path, and coupling means including unidirectional drive means between said motor and control member and said chains for transmitting motion from said motor and said control member to said chains, while blocking the transmission in the reverse directions, and means for transmitting the translatory movement of said sprocket to said operating mechanism.

6. In a device as claimed in claim 5, wherein at least one of said coupling means consists of an irreversible spring clutch adapted to transmit motion to the associated driving chain, while blocking transmission in the reverse direction.

7. In a device as claimed in claim 5, wherein at least one of said coupling means consists of a worm gear drive adapted to transmit motion to the associated driving chain, while blocking the transmission of motion in the reverse direction.

8. In a device of the type described, a reciprocating driven member, a driving motor, a manual operating member, multiple drive means connecting said motor and operating member with said driven member comprising a pair of flexible endless members with means for guiding the same along a straight path in spaced parallel relation to each other, a rotatable driving member cooperating with both said flexible members for rotation thereby and translation along said path, a unidirectional coupling between said motor and said operating member and one of said flexible members respectively for transmitting motion from said motor and said operating member to said driving member, while blocking transmission in the reverse direction, and means for transmitting translatory motion from said driving member to said driven member.

9. In a device of the type described, a reciprocating driving member, a driving motor, a manual operating member, multiple drive means connecting said motor and said operating member with said driven member comprising a pair of endless chains with means for driving and guiding the same along a straight path in parallel relation to each other, driving sprocket means with means for guiding the same along said path and being engaged by both said chains for rotation thereby and translation along said path, a unidirectional coupling between said motor and operating member and one of said chains respectively for transmitting motion from said motor and said operating member to said sprocket means while blocking transmission in the reverse direction, and means for transmitting translatory movement of said sprocket to said driven member.

10. In a device of the type described, a reciprocating driven member, driving means therefor comprising a rotary driven member, a pair of parallel slide members arranged to engage said driving member, at least one of said slide members being of endless flexible construction, means for driving said last mentioned member to impart rotational and translatory motion to said driving member, and means for transmitting translatory movement of said driving member to said driven member.

11. In a device of the type described, a reciprocating driven member, driving means therefor comprising a sprocket, a pair of parallel slide members arranged to engage said sprocket at diametrically opposite points thereof, at least one of said slide members being of endless flexible construction, means for driving said last mentioned member to impart rotational and translatory motion to said sprocket, and means for transmitting translatory movement of said sprocket to said driven member.

PETER F. ROSSMANN.
KARL RATH.

REFERENCES CITED

The following references are of record in the file of this patent:

UNITED STATES PATENTS

| Number | Name | Date |
|---|---|---|
| 1,457,316 | Price | June 5, 1923 |

FOREIGN PATENTS

| Number | Country | Date |
|---|---|---|
| 6,581 | Great Britain | Mar. 18, 1911 |